United States Patent Office 3,447,216
Patented June 3, 1969

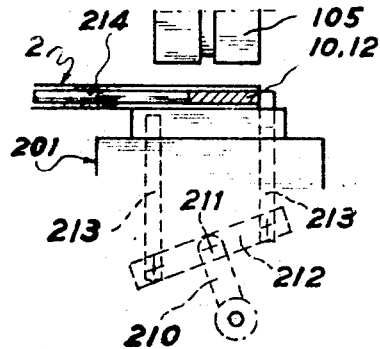
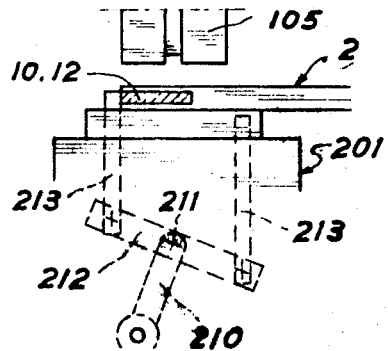
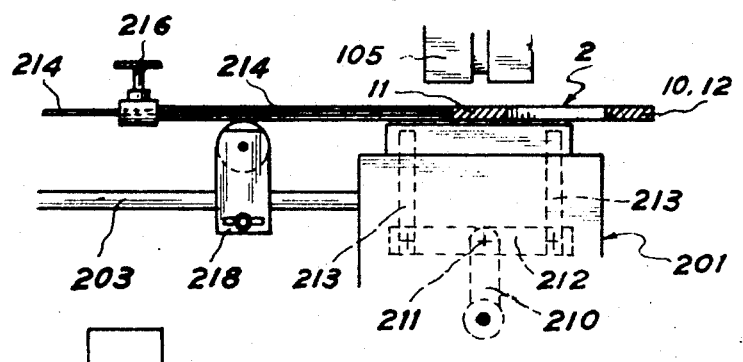
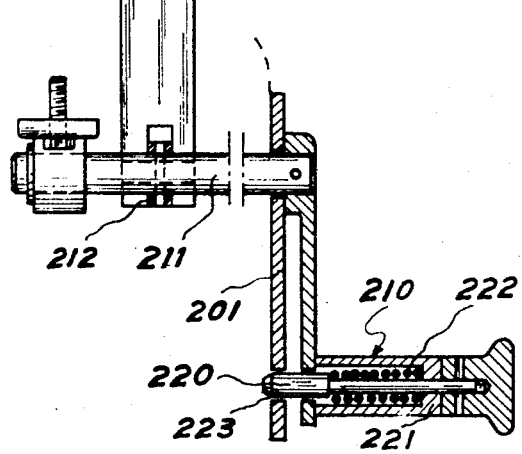

3,447,216
FINISHING AND ASSEMBLING TUBULAR
METAL SLATS OF ROLLER BLINDS
Jaime Colom Grau, Plaza General Primo de Rivera 31,
Tarrasa, Barcelona, Spain
Filed Feb 9, 1967, Ser. No. 614,980
Claims priority, application Spain, Feb. 15, 1966,
323,442; June 22, 1966, 328,239
Int. Cl. B23p 19/04
U.S. Cl. 29—24.5                    9 Claims

ABSTRACT OF THE DISCLOSURE

In the manufacture of roller blinds, a process for finishing and assembling tubular metal slats having inner cores adapted to receive interlinking elements, which comprises providing the inner cores with means rigidly connected thereto adapted to act as counter-punches, dies and guides in the punching-out and drawing operations for the slats and in the assembling operations of the interlinking elements, placing the inner cores with said means within the slats and performing the said punching-out, drawing and assembling operations for the slats with the co-operation of the said means on the inner cores. Also, a press for carrying out the said process.

---

This invention relates to a process for finishing and assembling tubular metal slats of roller shutters or blinds, more particularly slats of the kind adapted to receive inner core-receiving elements for linking the slats together, and to a punching and drawing press for the finishing.

Slats of this kind are used in tilting and graduatable blinds of the kind disclosed in United States Patent No. 2,912,048 comprising two vertical guides and a number of slats pivotally connected at their ends to a pair of side chains, for tilting the slats, and also connected to front chains, for transmitting the tilting movement from a master slat to the other tilting slats.

In the case of solid slats, e.g. of solid wood, some interlocking elements, such as pivots for connection to the side chains and members for anchorage to the front chains, can readily be secured in the material which makes up the slats; when, however, the slats are tubular instead of solid, such interlinking elements cannot be mounted directly on the slat walls, and cores, and must be placed in the slats (at the places wherein the interlinking elements are to be positioned) and the interlinking elements must be secured to the cores. In this case, the tubular slats must first be punched in order to form windows in the tubular slat walls by which the interlinking elements to be secured to the cores can be introduced.

Also, in order that the blind may be wound or rolled correctly onto to the associated drum, the front chains should, when the slats are in the vertical position, abut one another in re-entrant zones which are of adequate width and which are drawn in the corresponding surface of the slats; consequently, the slats must also be given a drawing treatment before the interlinking elements are secured to the cores.

These quenching and drawing operations—which will be referred to hereinafter in general as "finishing" operations—must at present be performed on special presses whose punch or drawing tool is associated with a counter-punch or die which must be so dimensioned and devised as to be placeable at the required place inside the tubular slat, then co-operate with the punch or drawing tool of the press, and then finally be readily extracted from inside the slat. Special presses of this kind are complicated, and have the disadvantage of being very expensive and can be bought only by blind factories or by large blind installation undertakings but not by the installation undertakings of the smaller and more conventional kind.

Once the finishing work on a tubular slat has been completed, it still remains to assemble the elements which together make up the blind. At present, some of the job of assembly comprises the stages of placing the inner cores in the slats exactly at the place where the windows or drawn portions have been formed, and of immobilizing the inner cores at such place by means of screw fasteners or the like, and of securing to the cores interlinking elements, such as anchor members with the side chains, also by means of screw fasteners. All the assembly stages are time-consuming and require skilled labor, with the result of a considerable increase in the cost of installing the blinds.

To obviate these disadvantages and also greatly to simplify installation, the invention provides a process for finishing and assembling tubular metal slats of roller blinds comprising the steps of providing inner cores rigidly connected to means adapted to co-operate in the finishing operations for the slats, placing the inner cores together with such means in their permanent position in the slats, and performing the finishing operations for the slats with the co-operation of the said means on the inner cores.

As a result of this process according to the invention, the presses performing the finishing operations do not need the special counter-punches or dies hereinbefore referred to, the function thereof now being performed by the corresponding inner cores since the same have appropriate provision for this work. The counter-punches or dies had to co-operate with the corresponding press punches or drawing tools very many times since they form part of the press equipment and therefore had to be made of a wear-resistant material, preferably tool steel. Now, however, the means according to the invention which are rigidly secured to the inner cores are required to co-operate with the press tools just once and can therefore be of a much weaker material and possibly even of the same material as the cores themselves; a very good material for the latter is aluminum or aluminum-based light alloys appropriate for die-casting. Also, the operations necessary in the prior art for removing the counter-punches or dies from inside the slats and of accurately replacing them with the inner cores are obviated completely, since in accordance with the invention the inner cores, together with the means rigily secured thereto, are placed in their final position in the slats during the placing or positioning stage or phase which is performed before the slats are given finishing treatment.

According to the invention, to perform the step of punching out windows in the slats, flanks or side-walls are provided on the inner cores in correspondence with at least one part of the contour of the windows to be punched in the slats, said flanks being adapted to serve as counter-punches during the operation of punching out the windows, this operation then being performed so that such flanks or side-walls co-operate with the corresponding press punching tool.

According to another feature of the invention, to perform the step of drawing re-entrant zones in one surface of the slats to enable interlinking elements to abut one another laterally, the inner cores are formed with recessed parts adapted to serve as a die during the step of drawing the re-entrant zones, this operation then being performed so that such recessed parts co-operate with the corresponding drawing tool.

If the interlinking elements or, more specifically, the front chains, comprise anchor members which are secured during assembly to the inner cores, each inner core is preferably formed, in correspondence with a part of the flanks serving as counter-punch, with two straight parallel grooves which are disposed opposite one another and which guide the anchor members like a slideway, then the anchor members are introduced into the inner cores by being slid along the grooves into their operative position, and, finally, the anchor members are secured in such operative position.

The invention also provides a punching press which comprises, in registration with means of the inner cores for co-operating in the steps of the finishing operation, abutment means which act against the inner cores received in the slats and determine their correct longitudinal position relative to the press, a tool being provided which has an operative part complementary to the said means of the inner cores and co-operating with the latter means in the performance of the finishing operations.

A press of this kind does not need the special counter-punches or dies previously referred to, since the function previously performed by such counter-punches or dies is now performed by the corresponding appropriately devised inner cores. The counter-punches or dies had to co-operate with the corresponding press elements very many times since they form part of the press equipment and therefore had to be made of a wear-resistant material, preferably tool steel. Now, however, the means according to the invention which are rigidly secured to the inner cores are required to co-operate with the press tools just once and can therefore be of a much weaker material and possibly even of the same material as the cores themselves; a very good material for the latter is aluminum or aluminum based light alloys appropriate for die-casting. Also the operations necessary in the prior art of removing the counter-punches or dies from inside the slats and of accurately replacing them by the inner cores are obviated completely, since in accordance with the invention the inner cores, together with the means rigidly secured thereto, are placed in their final position in the slats during the placing or positioning stage which is performed before the slats are given finishing treatment.

The invention will now be described in greater detail, reference being made to the accompanying exemplary drawings of some embodiments of the process and press according to the invention wherein:

FIGURE 16 is a section on the line XVI–XVI of FIGURE 14 and

FIGURES 17–19 are three views of part of the press of FIGURE 14 corresponding to three different operative positions of the press.

Figure 1:
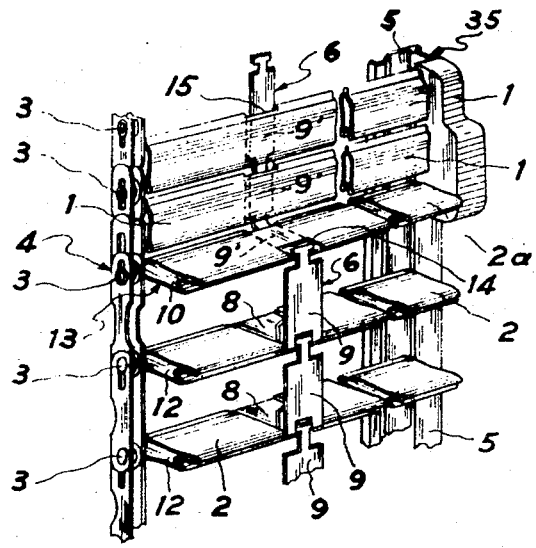
FIGURE 1 is a perspective view of a portion of a blind where there can be seen tilting slats and non-tilting slats.
Figures 12, 13:
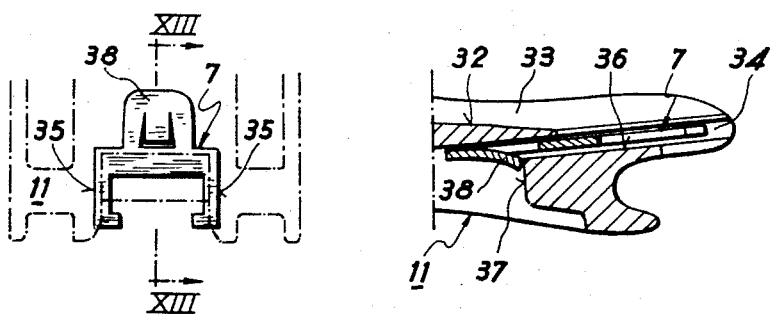
FIGURE 12 is an elevation view of an anchor member adapted to be secured to an inner core (shown partially in chain-dotted lines) for a tilting slat.
FIGURE 13 is a section on the line XIII—XIII of FIGURE 12 on an enlarged scale together with the corresponding part of the inner core.

The blind shown in FIGURE 1 comprises two kinds of slats, namely non-tilting slats 1 and tilting slats 2, 2a the top slat 2a being the master slat and the other slats 2 being ordinary tilting slats. All the slats have at each end pivots 3 articulated to side chains 4 (only the left-hand side chain is visible) sliding in guides 5 (only the right-hand guide is shown) and used to operate the blind. Front chains 6, only one of which is shown in this example, interconnect the tilting slats so that, when the master slat 2a is tilted, the ordinary slats 2 will also tilt. Through the agency of anchor members 7 (which cannot be seen in FIGURE 1 but which are shown in FIGURES 12 and 13) secured to the slats 2, 2a, each link 9 of the front chains 6 is articulated to a corresponding slat. The tilting slats 2, 2a have in one surface re-entrant zones 8 in which, when the tilting slats are positioned vertically, the front chains 6 are concealed and abut, thus facilitating correct rolling of the blind around a winding drum (not shown). After the master slat 2a, the front chain 6 ceases to be disposed outside the slats and has its links 9' disposed in the slats 1.

Figure 2:
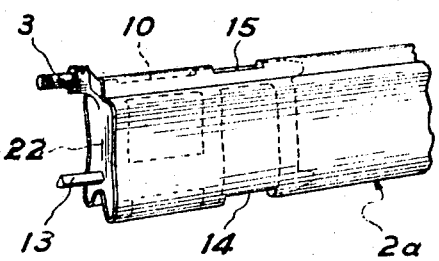
FIGURE 2 is a perspective view of part of a master tilting slat having an inner side core, the system having been given finishing treatment and being about to receive the side and front chains.
Figure 4:
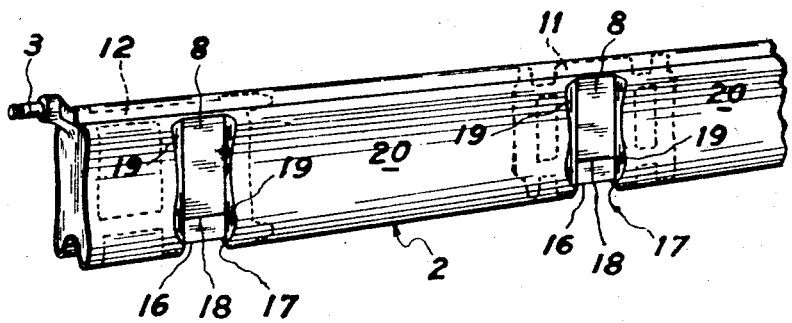
FIGURE 4 is a view similar to FIGURE 2 of an ordinary tilting slat having a side inner core and a central inner core.

As can be seen from FIGURES 2 and 4, the slats 2, 2a have inner cores 10–12 adapted to bear or secure interlinking elements, such as pivots 3, anchor members 7 (FIGURES 12 and 13), concealed links 9' (FIGURE 1) and guide pins 13 of the master slat 2a. Except for the pivots 3 and the pins 13 (which project from the sides of the tubular slats and do not need to extend through the slat walls), the other linking elements can be received by the inner cores only if they extend through windows formed in the walls of the tubular slats. For instance, the non-tilting slats 1 and the master slat 2a have windows 14, 15 (FIGURE 2) through which the concealed links 9' can extend, and the tilting slats 2 have windows 16–18 (FIGURE 4) formed by a front longitudinal edge 16 and a rear longitudinal edge 18 joined by two side edges 17.

FIGURE 4 shows clearly the re-entrant zones 8 whose plane base extends by way of inclined slopes 19 to the unmodified surface of the slat surface 20.

Figure 3:
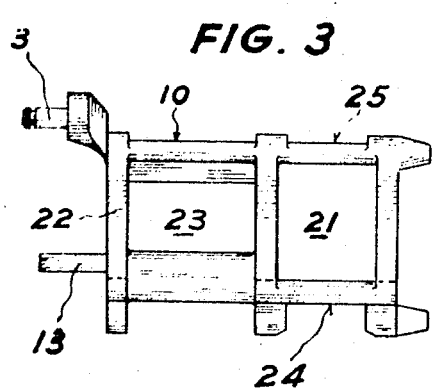
FIGURE 3 is an elevation view of an inner side core for a tilting master slat, the core having means for co-operating in the slat-finishing operations.

In the side inner core 10 which can be seen in FIGURE 3 and which is for use in the master slat 2a, there can be seen a main body or member 21 and an end plate 22 separated by a weight-reducing perforate part 23. According to the invention, the main member 21 has flanks or side walls 24, 25 which register with the shape of the windows 14, 15 respectively and which are adapted to serve as counter-punches during the operation of punching out windows in the master slat 2a. The end plate 22 serves as a support for the pivot 3 and for the guide pin 13 and also provides a lateral cover for the tubular slat.

Figure 5:
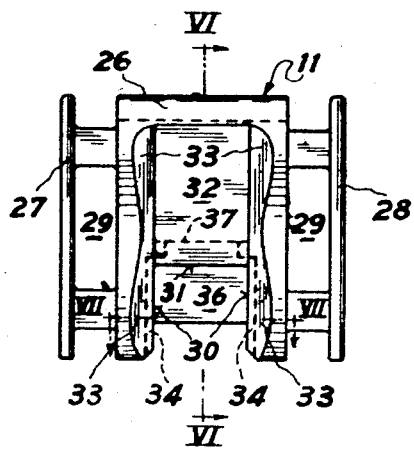
FIGURE 5 is a view similar to FIGURE 3 of an inner central core for an ordinary tilting slat.
Figure 6:
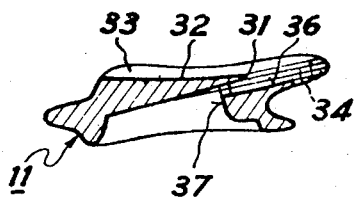
FIGURES 6 and 7 are sections on the lines VI—VI and VII—VII respectively of FIGURE 5.
Figure 7:
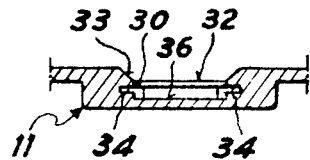

In the central inner core 11 which can be seen in FIGURE 5 and which is of use with the tilting slats 2, there can be seen a main body or member 26 and two side ribs 27, 28 separated by two weight-reducing perforate parts 29. According to the invention, the body 26 has flanks or side walls 30, 31 which register with the edges 17, 18 respectively of the windows in the slats 2 which are adapted to serve as counter-punches during the operation of punching out the later windows; the side inner slats 12, which are not shown in detail, have a similar provision.

In the central inner core 11 and in the side cores 12 which are not shown, there is a recessed part 32 bounded laterally by inclined planes 33 registering with the reentrant zone 8 and the inclined slopes 19 respectively of the surface 20 of the slats 2, and which are adapted to serve as a die during the operation of drawing this reentrant zone.

Figure 8:
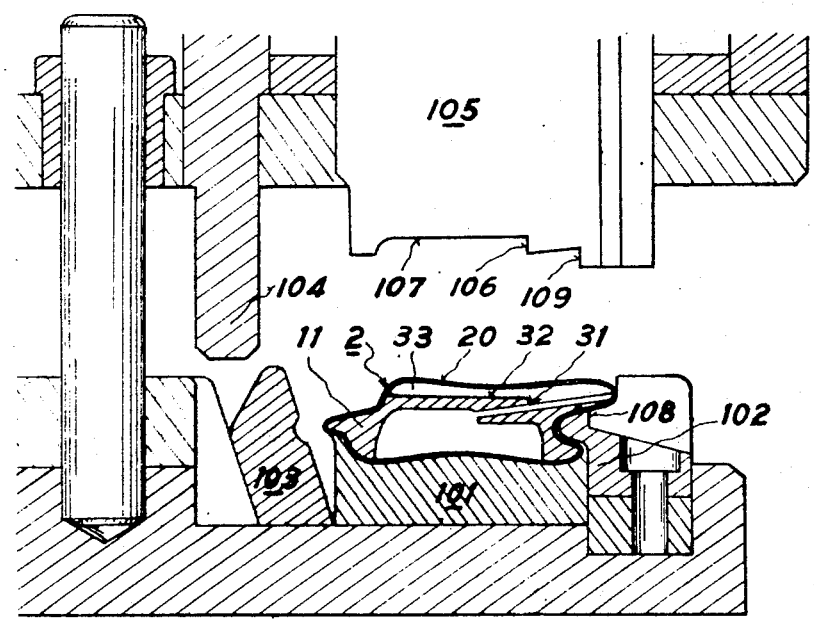
FIGURE 8 is a vertical section through the top part and bottom part of a press for performing the process according to the invention, the press being fed with an ordinary tilting slat which is about to be given a finishing treatment, the view being on the line VIII—VIII of FIGURE 14.
Figure 9:
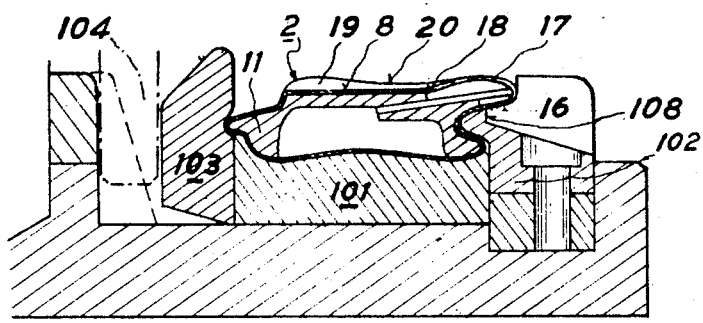
FIGURE 9 shows the bottom part of FIGURE 8 after the slat has had windows punched therein and re-entrant zones formed therein.

FIGURES 8 and 9 make readily apparent how the process according to the invention for finishing—i.e. for punching and drawing—tubular slats such as the tilting slats 2 can be performed by means of a press. First, the inner core 11 or 12 is placed in its final position in the slat 2 through the agency of abutments which also determine the correct longitudinal position of the slat relative to the press. For correct transverse positioning of the slat 2, there is in the bottom part of the press a seat member 101 associated with a stationary jaw 102 and with a moving jaw 103 which are disposed on each side of the slat to be treated and which serve as lateral guides thereof; the moving jaw 103 is so mounted that it is normally in the open position (FIG. 8), e.g. by virtue of its own weight or through the agency of a spring (not shown). Rigidly secured at the top part of the press is a tailpiece 104 so disposed that, when the two parts of the press come together, the tailpiece 104 thrusts the moving jaw 103 laterally into the closed position shown in FIGURE 9. Also disposed at the top of the press is a tool 105 which serves as a punch and as a drawing tool; accordingly, the operative part of the tool 105 has cutting edges 106 in opposition to the flanks or side walls 30, 31 of the inner core 11, 12 and a drawing zone 107 matching the recess part 32 in the inner core. The stationary jaw 102 has a flank or side wall 108 which opposes a cutting edge 109 of the tool 105. When the press operates, its two parts come together, so that first the jaws 102, 103 because of the tailpiece 104, come into the closed position and the slat 2 is gripped firmly in the press, whereafter the tool 105 is applied against the slat 2 and the tool cutting edges 106, 109 act against the side wall or flank 31 of the core 11 and the side wall or flank 108 of the stationary jaw 102, which cooperatively serve as a counter-punch, and cut the edges of the windows 16–18 required in the tubular slat 2. Simultaneously, the drawing zone 107 of the tool 105, which acts as a male member, co-operates with the recessed part 32 of the core 11, which serves as a die, and produces in the surface 20 of the tubular slat 2 a re-entrant zone 8 and the inclined slopes 19. Finally, the two parts of the press move apart from one another and the finishing operation is complete, since the inner core has already been placed in its permanent position in the tubular slat 2, and because of the re-entrant zone 8, has been completely immobilized in the slat 2 without any extra step being required.

Figure 10:
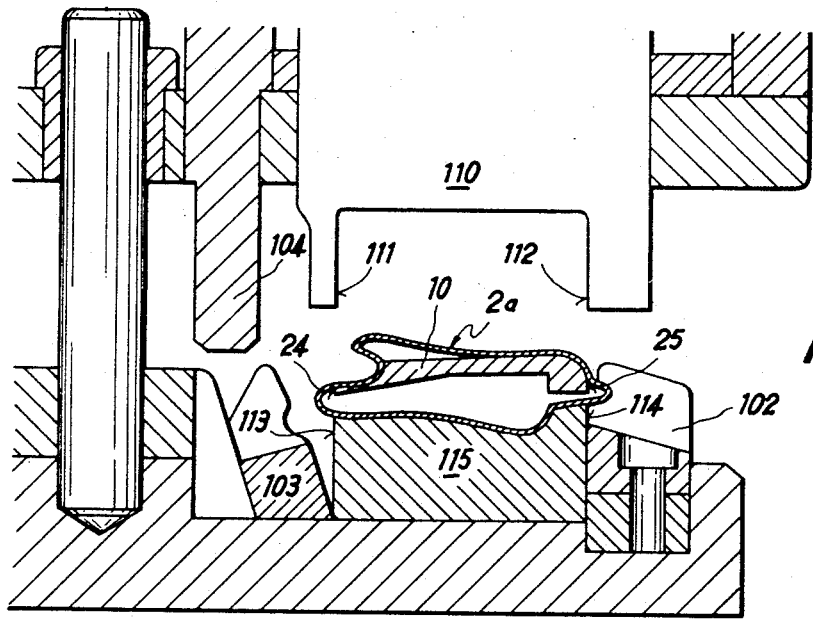
FIGURES 10 and 11 are views similar to FIGURES 8 and 9, but of a slat requiring only the punching out of windows.
Figure 11:
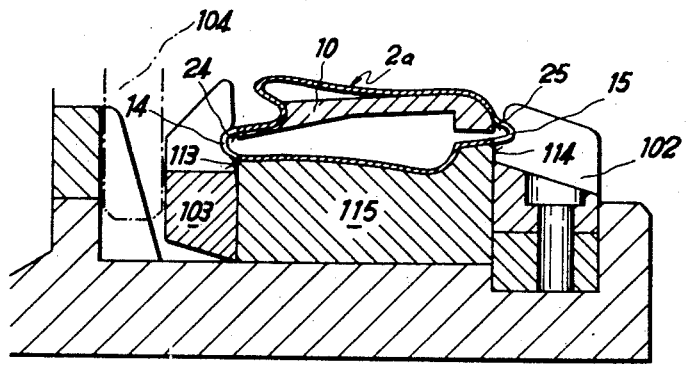

FIGURES 10 and 11 diagrammatically show how a master slat 2a is given the finishing process according to the invention which in this case comprises just the step of punching out windows. The tool 110 has in this case cutting edges 111, 112 which co-operate with the flanks or side walls 24, 25 of the inner slat 10 and with the flanks or side walls 113, 114 of the seating member 115 to produce the windows 14, 15 in the tubular slat 2a.

To assemble the tilting slats 2 to form a roller blind, the anchor members 7 must be introduced and secured in the inner cores 11, 12. According to the invention, to facilate these stages of the assembly operation, the means shown in FIGURES 5–7, 12 and 13 are used. The inner core 11 is formed with two straight grooves 34 which are disposed parallel and opposite one another adjacent the flanks 30 which serve as counter-punches. The anchor members 7 have side edges 35 which are also parallel to one another and which are so shaped and dimensioned that the anchor member can be introduced into the inner core 11 by being slid along the grooves 34 as along a slideway until reaching the operative position, shown in FIGURES 12 and 13, in which position the anchor member is secured. To facilitate the securing of the anchor members, a bed 36 terminating in a retaining edge 37 is disposed between the straight grooves 34 of the inner core, and the anchor member has a resilient claw 38 which extends beyond the plane of the anchor member. The relative position of the bed 36, retaining edge 37 and resilient claw 38 is such that, while the anchor member 7 is being introduced via the grooves 34, the bed 36 thrusts the resilient claw 38 and keeps the same deformed towards the plane of an anchor member, but when the latter reaches its operative position, the resilient claw 38 passes beyond the retaining edge 37 and ceases to be thrust by the bed 36 and therefore displaces itself outwards and is engaged in the retaining edge 37, producing the required securing of the anchor member 7 to the inner core 11 in the manner visible in FIGURE 13. With regard to FIGURE 13, it should be noted that the anchor member 7 is introduced into the secured to the inner core 11 after the same has been placed in its final position in the corresponding tubular slat 2; the latter has been omitted from FIGURE 13 for the sake of clarity in the drawing.

Figure 14:
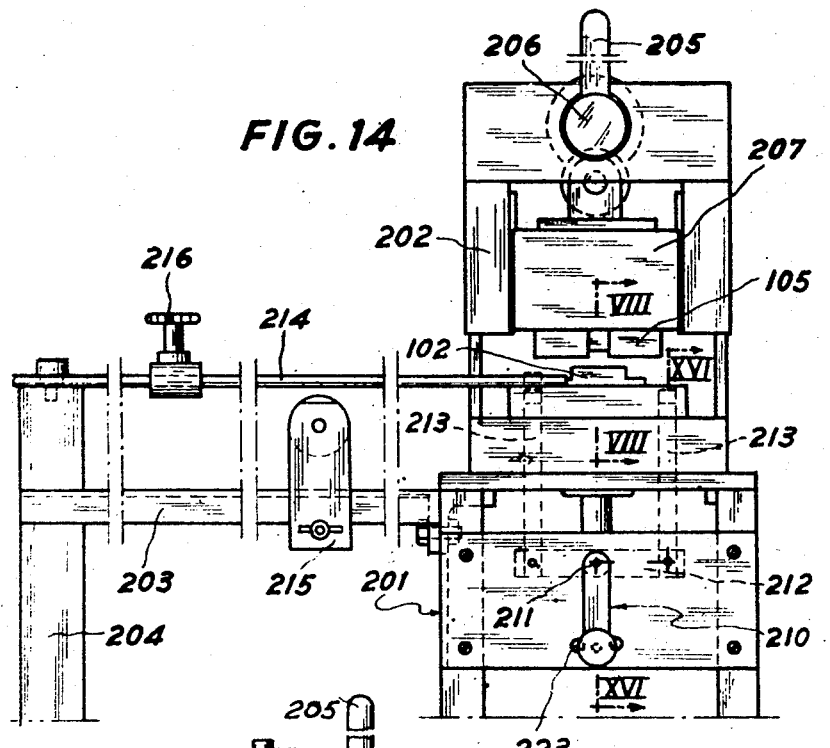
FIGURE 14 is a front elevation view of the punching and drawing press for slat finishing according to the invention.
Figure 15:
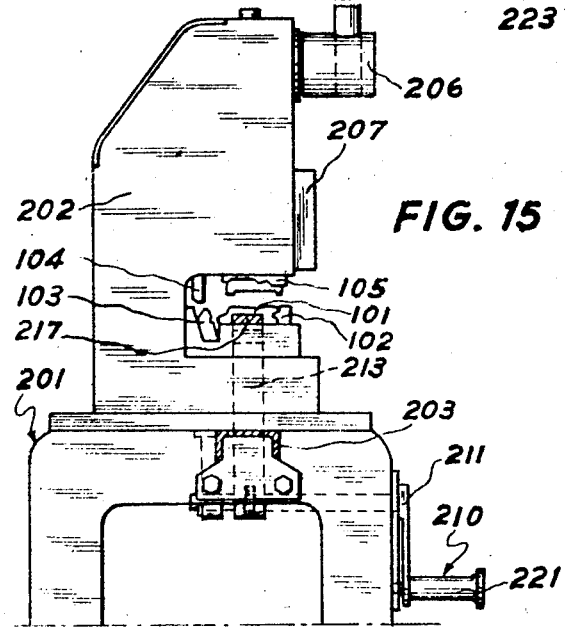
FIGURE 15 is a view in side elevation of a part of the press shown in FIGURE 14.

Referring to FIGURES 14–16, the punching press according to the invention comprises a frame 201 bearing a head piece 202 bearing the moving parts. A graduated longitudinal member 203 is mounted in the frame 201 and rests at the opposite end on a foot 204. The moving elements comprise a handle 205 which rotates with a spindle 206 to operate a block 207 bearing the punching and drawing tools 105 which slide vertically in the headpiece 202. Through the agency of a spindle 211, a handle 210 acts on an articulated lever 212 having two rods 213 whose top ends form abutments for the front end of the slats 2 being treated in the press. For transverse retention of the slats 2, the press comprises a set of lateral abutments formed by stationary jaw 101, 102 and by moving jaw 103 disposed at the bottom part, and by top tailpiece 104 which acts on the moving jaw 103. The slats 2 are disposed on a rod 214 disposed above the longitudinal member 203 so as to be slidable thereon into the consecutive positions required for the operations to be performed by the press. Disposed on the member 203 is a movable support 215 for the slats 2, and disposed on the rod 214 is a sliding abutment 216 which secures the position of the rear end of the slats 2 in order to immoblize the same lengthwise. The handle 210 has a pivot 220 in the grip 221, the pivot 220 being resiliently mounted through the agency of a helical spring 222 introducible into holes 23 of the frame 201 in order to determine its operative or end positions. The slats 2 bear a number of inner cores 10–12, the number thereof being proportional to slat length. The cores 10–12 have flanks and recess parts matching the contour of the jaws 102, 103, of the seat member 101 and of the tool 105 and therefore act as counter-punch and counter-die.

Referring to FIGURES 17–19, the press operates as follows:

A slat 2 is placed on the rod 214 so that the front end of the slat 2 is disposed above the frame 201 in coincidence with the operative elements of the press. The lateral abutments, namely the jaws 102, 103, are then adjusted from the open position, so that the moving jaw 103 is thrust by the tailpiece 104 until reaching its closed position, such position being reached when the two parts of the press meet. The longitudinal abutments—i.e., the sliding abutment 216 and the corresponding articulated rod 213—are then adjusted by operation of handle 210, so that the slat 2 is immoblized and ready to be treated by the press.

Operation by the press is performed through the agency of the handle 205 which causes the block 207 with its tool 105 to move until coinciding with the waiting slat 2. The action of the tool 105 takes the form of various drawings and punchings in the slat 2 in the zone corresponding to the inner core 10, 12 which is disposed first, and in accordance with its side walls and recess parts which serve as a counter-punch and a counter-die.

The slat 2 is then released and positioned in the next operative position coinciding with that of the inner core 11 which is placed second. To this end, the corresponding transverse and longitudinal abutments are moved as required so that the rods 213 are now inoperative—i.e. with the handle 210 in its central position.

The same procedure is followed in respect of the intermediate inner cores which follow the core just mentioned. When the inner core 10, 12 at the opposite end is reached, the handle 210 is operated again for the corresponding rod 213 to act as required. The finishing operation for the slat 2 is then complete and the same is removed from the press to enable another identical slat to be treated.

The foregoing description has been given with reference to slats for tilting and graduatable roller blinds, but the invention is not limited to this and is therefore of use with any kinds of slat for roller blinds having inner cores adapted to receive interlinking elements. In general, no importance attaches to the material used for the tubular slats and inner cores, although the same are preferably metallic or of synethetic resin. The only limitations on the shape and arrangement of the windows to be punched out are those imposed by the essential features of the process according to the invention, independently of whether the punches act perpendicularly to the main plane of the slats, as in the example shown, or act parallel to or at the inclination to such main plane.

What I claim is:

1. A process for finishing and assembling tubular metal slats of roller blinds, the tubular slats being of the kind adapted to receive inner cores receiving interlinking elements, wherein the improvement comprises the steps of providing inner cores rigidly connected to means adapted to co-operate in the finishing operations for the slats, placing the inner cores together with such means in their permanent position in the slats, and performing the finishing operations for the slats with the co-operation of said means on the inner cores.

2. In a process for finishing and assembling tubular metal slats of roller blinds as set forth in claim 1, in which the finishing comprises punching out windows in the slats in order to make them adapted to receive interlinking elements, the steps of providing, on the inner cores, flanks adapted to serve as counter-punches during the step of punching out the windows, said flanks being in correspondence with at least one part of the contour of the windows to be punched out from the slats, positioning the inner cores together with their flanks in their final position in the slats, and punching out the windows for interlinking elements in the slats, the flanks which are disposed on the inner cores serving as counter-punches.

3. In a process for finishing and assembling tubular metal slats of roller blinds as set forth in claim 2, in which the finishing operation also comprises drawing re-entrant zones in one surface of the slats to enable interlinking elements to abut one another laterally, the steps of forming, in addition, the inner cores with recessed parts adapted to serve as a die during the operation of drawing the re-entrant zones, and drawing in one of the slat surfaces the re-entrant zones for the abutment of interlinking elements.

4. In a process for finishing and assembling tubular metal slats of roller blinds as set forth in claim 1, in which the interlinking elements are of the kind comprising anchor members secured during assembly to the inner cores, the steps of providing in addition each inner core, in correspondence with a part of the flanks serving as counter-punches, with two straight parallel grooves which are disposed opposite one another and which guide the anchor members like a slideway, introducing the anchor members into the inner cores by being slid along the grooves into their operative position, and securing the anchor members in such operative position.

5. In a process for finishing and assembling metal slats of roller blinds as set forth in claim 4, the steps of providing in addition each anchor member with a resilient claw which projects beyond the plane of the anchor member, forming each inner core between the straight grooves with a bed terminating in a retaining edge said bed being so disposed as during the introduction of the anchor member to thrust the resilient claw, deforming it, towards the plane of the anchor member, the retaining edge being so disposed as to register with the resilient claw when the anchor member is in its operative position, and introducing the anchor members into the inner cores by being slid along the respective straight grooves until the resilient claw passes beyond the corresponding retaining edge.

6. A punching and drawing press for finishing tubular metal slats of roller blinds, the tubular slats being of the kind adapted to receive inner cores, wherein the improvement comprises, in registration with means of the inner cores for co-operating in the steps of the finishing operations, abutment means which act against the inner cores received in the slats and determine their correct longitudinal position relative to the press, and a tool including an operative part complementary to the said means of the inner cores and co-operating with the latter means in the performance of the finishing operations.

7. A press as set forth in claim 6 adapted to perform the operation of punching out windows in an edge of the slats and the operation of drawing re-entrant zones in one surface of the slats, wherein said means of the inner cores comprises, in registration with the tool, flanks serving as a counter-punch and recessed parts which serve as a counter-die, the operative part of the tool having actuating edges complementary to the said flanks, and a drawing zone complementary to the said recessed parts.

8. A press as set forth in claim 6 comprising means for correctly locating the slats relative to the press, said means comprising a fixed jaw and a moving jaw, both jaws being disposed in the bottom part of the press on each side of a space for the slat to be worked on, the moving jaw being so disposed as normally to be in the open position, and a tailpiece rigidly secured to the top part of the press so disposed that, when the two parts of the press come together, it thrusts the moving jaw laterally, shifting it into the closed position.

9. A press as set forth in claim 6, comprising two retractable abutments disposed symmetrically on both sides of the tool, in the bottom part of the press, each abutment being formed by the top end of two vertical sliding rods whose bottom ends are pivotally connected to the respective ends of a lever which tilts around its center and which can take up a horizontal position and two symmetrically inclined positions, the vertical rods being of a length such that the two abutments are concealed when the lever is horizontal, while one abutment projects, and the other is concealed, when the lever is inclined.

References Cited

UNITED STATES PATENTS 3,137,004   6/1964   Williamson _____ 29—24.5

RICHARD H. EANES, Jr., *Primary Examiner.*